Patented Sept. 30, 1952

2,612,454

UNITED STATES PATENT OFFICE 2,612,454

METHOD OF MODIFYING BUTTER

Carl Hugo Bettman, Cedarhurst, N. Y.

No Drawing. Application September 14, 1950,
Serial No. 184,898

2 Claims. (Cl. 99—121)

The invention relates to the art of food preservation, more especially to the preservation of butter for relatively long periods of time without recourse to refrigeration. Heretofore, butter, unless kept at temperatures sufficiently low to maintain it in the congealed state, rapidly became rancid and unfit for use.

I have found that by modifying the natural butter in the manner hereinafter set forth it is no longer necessary to apply refrigeration thereto for its preservation.

The invention has for an object to modify natural butter such that it will not become rancid over relatively long periods of time even though it be exposed to the usual prevailing ambient temperatures.

Another object of the invention is to provide a process for effecting removal of certain objectionable ingredients of natural butter which I have discovered contribute to the rendering of the same rancid unless the butter is kept under refrigeration.

Still another object of the invention is to provide a modified form of butter possessing the aforesaid desirable properties.

The invention has for an object, also, to combine with butter possessing the aforesaid keeping quality another edible substance to afford a mixture having an enhanced spreading property.

In carrying out the invention, natural butter is to be liquefied by heating it slowly, while adding thereto a relatively small amount of salt, whereupon the batch is brought substantially to the boiling point of the butter as rapidly as is feasible. The addition of the salt may be deferred, however, until the butter is fully liquefied when it may be introduced with stirring.

The heating is then discontinued and the batch is allowed to cool and settle out into a mass of three strata—one, a cheese-like substance; another, a milk-like substance, between which and the former substance is the solidified mass of the modified butter. This mass is then to be separated from the residue of cheese-like and milk-like substances for use.

In its modified form, this butter will not become rancid at the usual prevailing temperatures to which it is exposed for periods of over one year, the only precaution to be observed being to avoid its exposure to actinic rays. While, of course, a somewhat appreciable loss of weight in the original mass of butter is entailed when it is so treated, yet this in many instances is far outweighed by the non-rancidity property which has been imparted to it by the novel process.

The proportion of salt to be added is approximately one-quarter pound for each one hundred pounds of the natural butter treated, this salt being substantially eliminated in the subsequent treatment for separation of the modified butter and removal of the residue.

A convenient manner of disposing of the residue is to first skim or strain off the milk-like substance which constitutes an upper stratum of the product, and then separate the intermediate modified butter stratum from the bottom stratum of cheese-like substance as by means, for example, of a knife. Or, the separation may be effected by other means, for example, by solidifying the entire mass as in lowering sufficiently the temperature of the same so that each stratum may be severed. The residue substances thus obtained as a by-product may be utilized, for example, as food for hogs or other animals.

To compensate in part for the loss of weight in the original mass of butter and greatly increase the volume of the modified form, as well as to enhance the spreading property of such modified form, there may be mixed with the latter a gelatinous substance such as a hot aqueous solution of a high-grade gelatin and the two substances thoroughly mixed by beating the same together, for example, in a mechanical mixer. The proportion of the gelatin added may be varied to suit the consistency of the spread desired, and I have found that a mixture of 300 parts by weight of the modified butter to 1 part of gelatin of the best quality in solution affords very satisfactory spread and of a volume substantially greater than the original mass of the modified butter.

Instead of the gelatin, other gelatinous substances such as agar agar may be utilized, the procedure being substantially the same except that a lesser proportion of the material is necessary due to its greater concentration. Also, in order to dissolve the agar agar it is necessary to boil the same, as is well understood. Of course, the agar agar does not introduce any food value as is the case with the gelatin.

I claim:

1. The method of processing butter, which comprises melting a batch of natural butter by heating the same, then increasing the temperature thereof, while adding a relatively small amount of salt thereto, to bring the batch approximately to the boiling point of the butter, discontinuing then the heating of the batch, cooling the same to cause it to settle out into a stratified mass of a cheese-like substance, a modified mass of butter and a milk-like substance, and separating the modified butter portion from the residue.

2. The method of processing butter according to claim 1, wherein for every 100 pounds of pure butter there is added approximately ¼ pound of the salt.

CARL HUGO BETTMAN.

REFERENCES CITED

The following references are of record in the file of this patent:

UNITED STATES PATENTS

| Number | Name | Date |
|---|---|---|
| 856,353 | Martin et al. | June 11, 1907 |
| 1,024,009 | Kronenberger | Apr. 23, 1912 |
| 1,264,336 | Rogers | Apr. 30, 1918 |
| 1,554,151 | White | Sept. 15, 1925 |